US011874550B2

(12) United States Patent
Okita

(10) Patent No.: US 11,874,550 B2
(45) Date of Patent: Jan. 16, 2024

(54) DISPLAY DEVICE OR ELECTRONIC DEVICE

(71) Applicant: Japan Display Inc., Tokyo (JP)

(72) Inventor: Mitsutaka Okita, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/961,573

(22) Filed: Oct. 7, 2022

(65) Prior Publication Data

US 2023/0032546 A1 Feb. 2, 2023

Related U.S. Application Data

(63) Continuation of application No. 17/539,196, filed on Dec. 1, 2021, now Pat. No. 11,493,801.

(30) Foreign Application Priority Data

Dec. 1, 2020 (JP) ................................ 2020-199522

(51) Int. Cl.
*G02F 1/1335* (2006.01)
*G02F 1/1333* (2006.01)
*G02F 1/139* (2006.01)

(52) U.S. Cl.
CPC ...... *G02F 1/133531* (2021.01); *G02F 1/1393* (2013.01); *G02F 1/133331* (2021.01); *G02F 1/133512* (2013.01)

(58) Field of Classification Search
CPC ......... G02F 1/133531; G02F 1/133331; G02F 1/133512; G02F 1/1393
See application file for complete search history.

(56) References Cited

U.S. PATENT DOCUMENTS

2021/0263375 A1* 8/2021 Hasegawa ............... F21V 23/00
2021/0311366 A1* 10/2021 Tsunashima .......... G02F 1/1368
2021/0349344 A1* 11/2021 Koito ...................... G02F 1/294

FOREIGN PATENT DOCUMENTS

WO WO-2020095607 A1 * 5/2020 ........... G02B 6/0076
WO WO-2020129343 A1 * 6/2020 ........... G02F 1/1333
WO WO-2020152963 A1 * 7/2020 ....... G02F 1/133345

* cited by examiner

*Primary Examiner* — Edward J Glick
*Assistant Examiner* — David Y Chung
(74) *Attorney, Agent, or Firm* — XSENSUS LLP

(57) ABSTRACT

According to one embodiment, a display device comprises a liquid crystal layer held between a first substrate and a second substrate, a display region having a first region in which a plurality of pixels are provided, a non-display region provided in an island-like shape in the display region and having a second region, a first polarizer and a second polarizer that overlap the first region, and a third polarizer and a fourth polarizer that overlap the second region, wherein a transmission axis of the fourth polarizer and a transmission axis of the second polarizer form an angle other than 0° and other than 90° with each other.

8 Claims, 10 Drawing Sheets

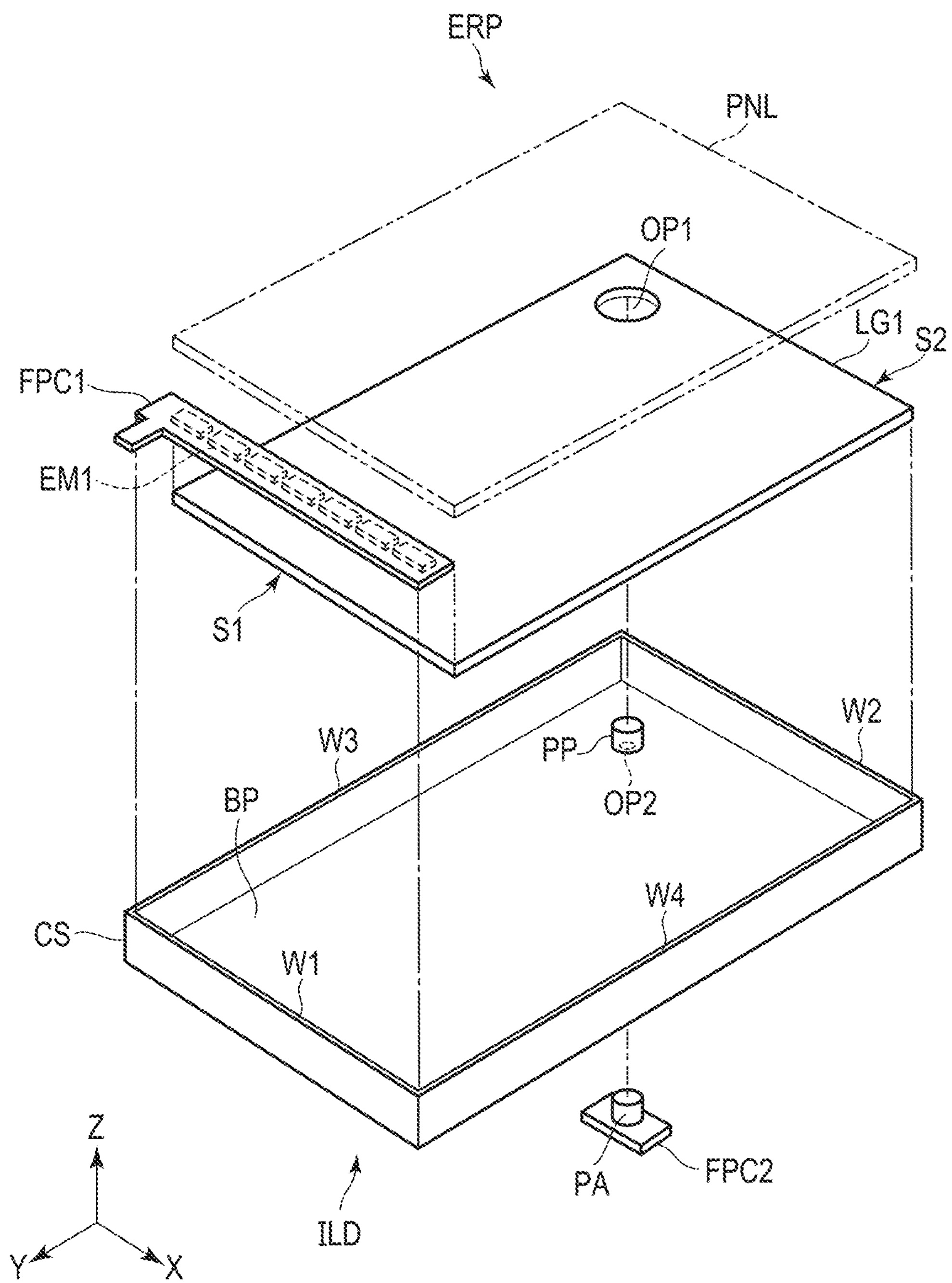
F I G. 1

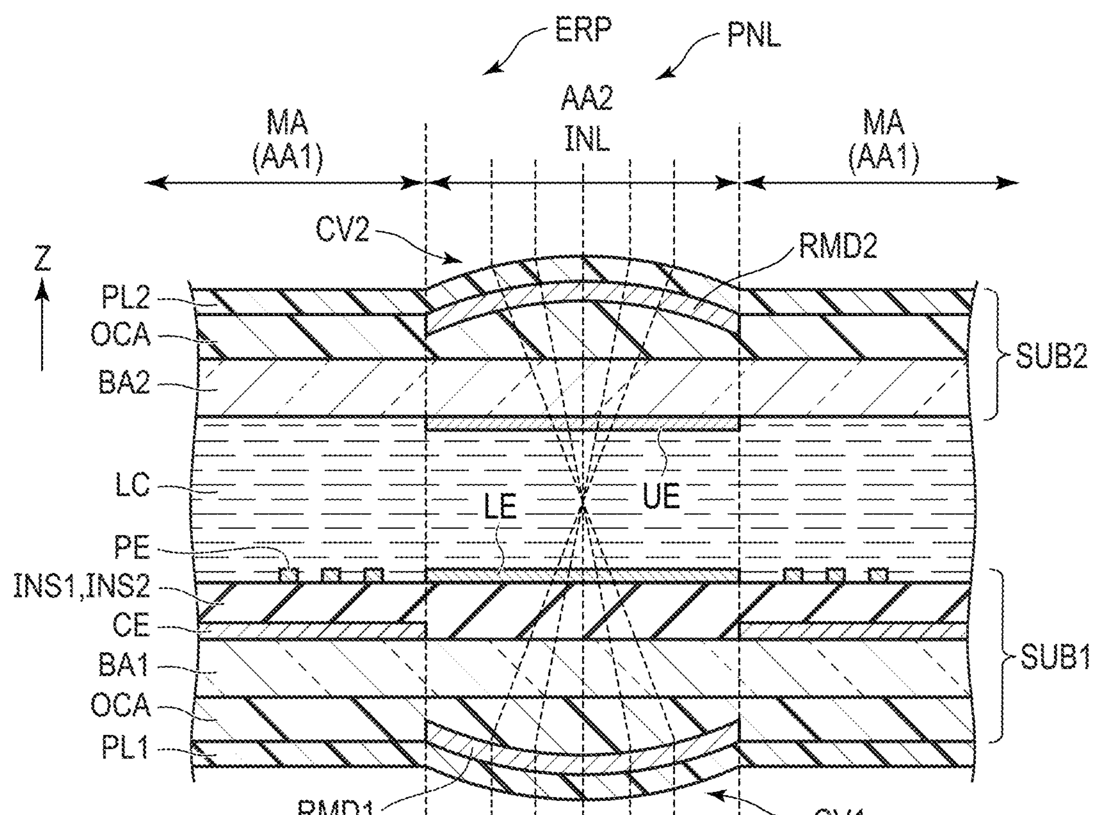
F I G. 7A
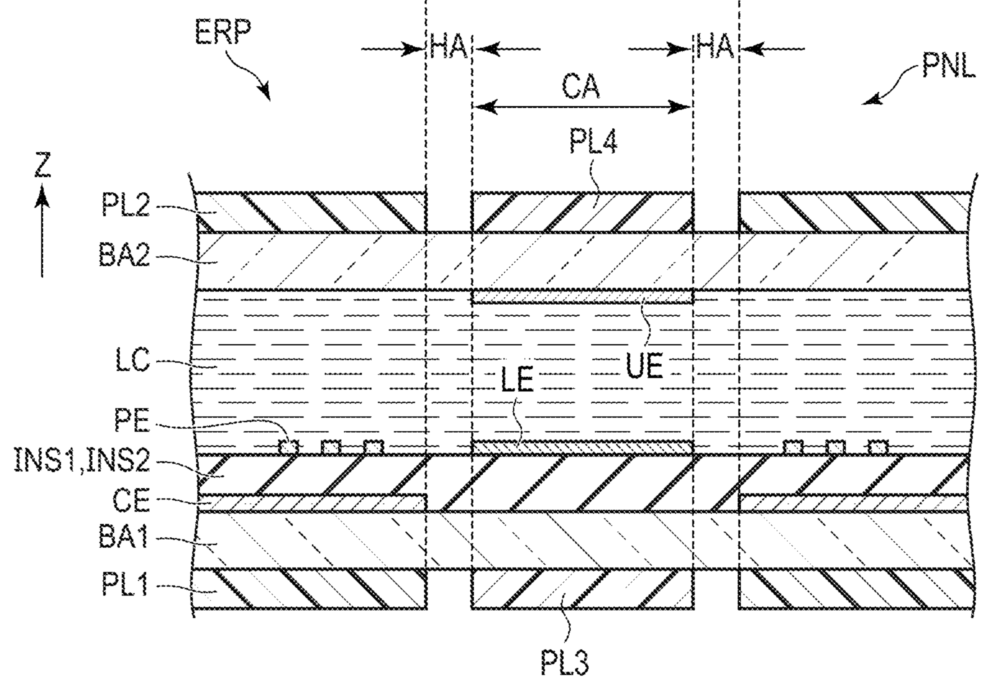
F I G. 7B

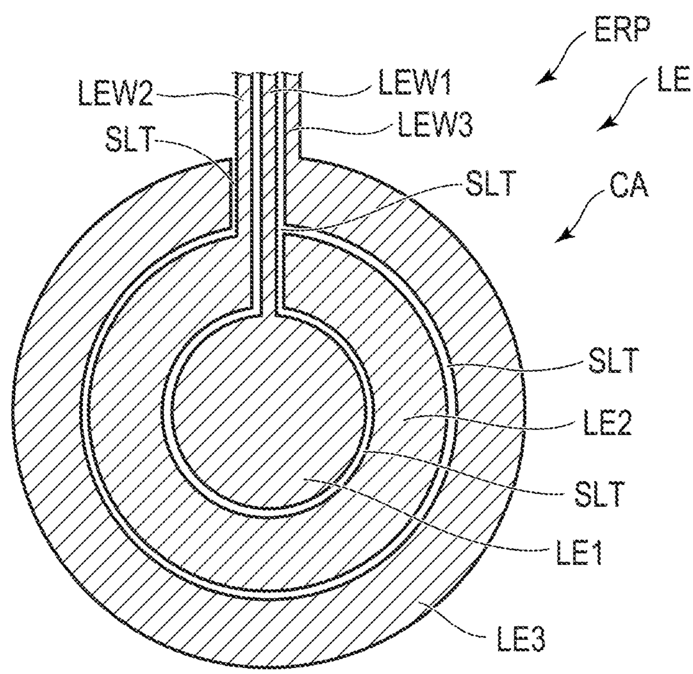
F I G. 10A
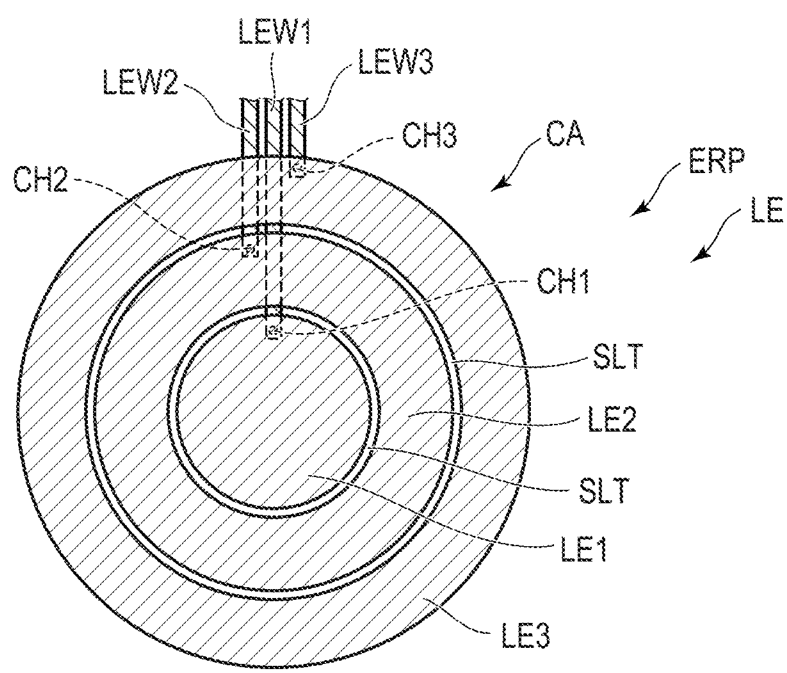
F I G. 10B

DISPLAY DEVICE OR ELECTRONIC DEVICE

CROSS-REFERENCE TO RELATED APPLICATIONS

This application is a continuation of U.S. application Ser. No. 17/539,196, filed Dec. 1, 2021, which is based upon and claims the benefit of priority from Japanese Patent Application No. 2020-199522, filed Dec. 1, 2020, the entire contents of each of which are incorporated herein by reference.

FIELD

Embodiments described herein relate generally to a display device or an electronic device.

BACKGROUND

In recent years, an electronic device including a display region and an imaging element on the same surface side has been widely put into practical use. In such an electronic device, the imaging element is provided outside the display region, and there is an increasing demand for reducing a frame width outside the display region while securing a space for installing the imaging element.

In addition, it is desired to be able to capture a clear image.

BRIEF DESCRIPTION OF THE DRAWINGS

FIG. 1 is an exploded perspective view illustrating an electronic device according to an embodiment.

FIG. 7A is a schematic cross-sectional view of an electronic device of a comparative example.

FIG. 7B is a schematic cross-sectional view of the electronic device according to the embodiment.

FIG. 10A is a view illustrating a configuration example of the electronic device according to the embodiment.

FIG. 10B is a view illustrating a configuration example of the electronic device according to the embodiment.

DETAILED DESCRIPTION

Figure 2A:
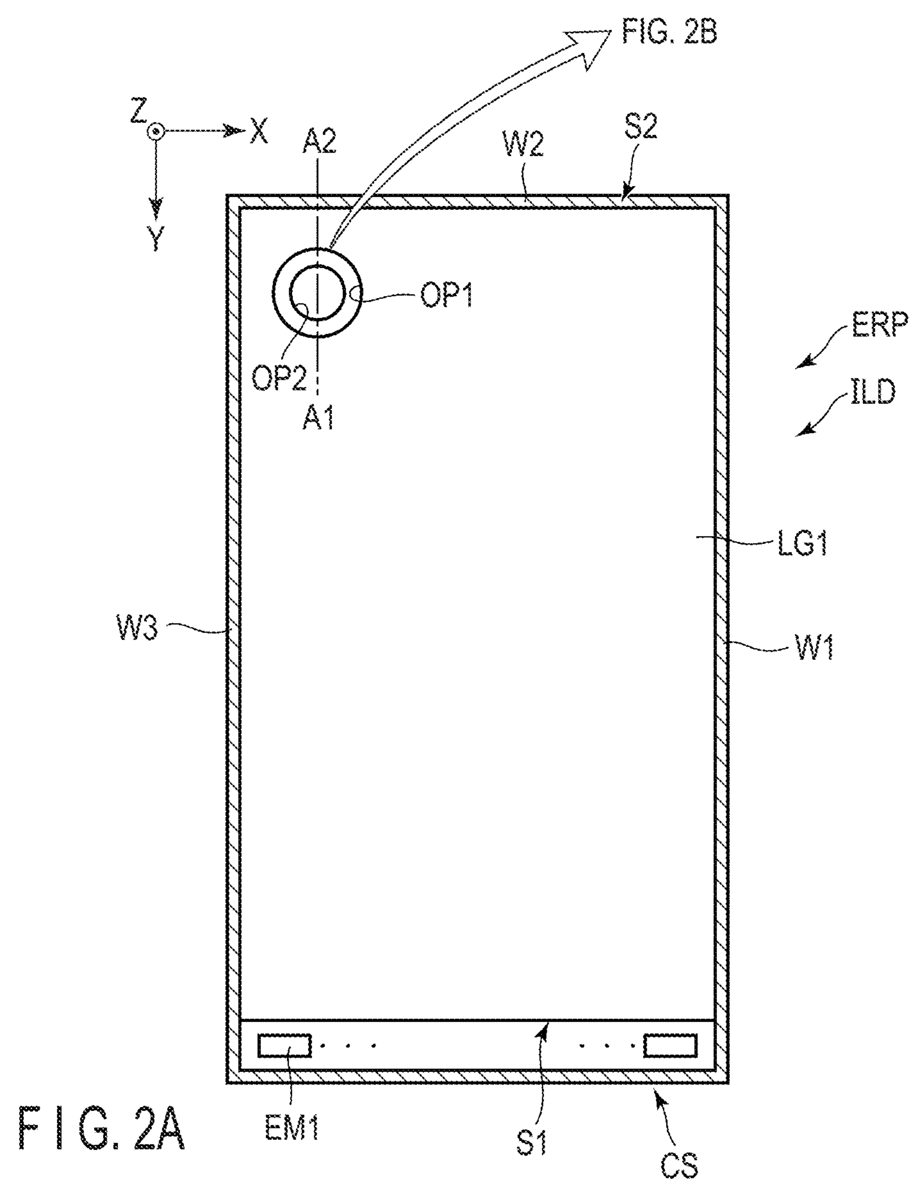
FIG. 2A is a plan view of the electronic device according to the embodiment.

In general, according to one embodiment, a display device comprises a first substrate; a second substrate; a liquid crystal layer held between the first substrate and the second substrate; a display region, the display region having a first region in which a plurality of pixels are provided; a non-display region provided in an island-like shape in the display region, the non-display region having a second region; a first polarizer that overlaps the first region and is in contact with the first substrate; a second polarizer that overlaps the first region and is in contact with the second substrate; a third polarizer that overlaps the second region and is in contact with the first substrate; and a fourth polarizer that overlaps the second region and is in contact with the second substrate, wherein a transmission axis of the fourth polarizer and a transmission axis of the second polarizer form an angle other than 0° and other than 90° with each other.

According to another embodiment, an electronic device comprises an imaging element; and a display panel overlapping the imaging element, the display panel comprising a display region and a non-display region provided adjacent to each other in the display region, wherein the display region has a first substrate, a second substrate, and a liquid crystal layer held between the first substrate and the second substrate, the display region has a first region in which a plurality of pixels are provided and a second region overlapping the imaging element, the display panel has a first polarizer that overlaps the first region and is in contact with the first substrate and a second polarizer that overlaps the first region and is in contact with the second substrate, the display panel has a third polarizer that overlaps the second region and is in contact with the first substrate and a fourth polarizer that overlaps the second region and is in contact with the second substrate, and a transmission axis of the fourth polarizer and a transmission axis of the second polarizer form an angle other than 0° and other than 90° with each other.

According to the present embodiment, it is possible to provide an electronic device capable of improving quality of a captured image.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

An electronic device according to an embodiment will be described hereinafter with reference to the accompanying drawings.

In this embodiment, a first direction X, a second direction Y and a third direction Z are orthogonal to each other, but they may intersect at an angle other than 90°. Further, a direction forwarding a tip of an arrow indicating the third direction Z is defined as "upward" and a direction forwarding oppositely from the tip of the arrow is defined as "downward".

Further, with such expressions "a second member above a first member" and "a second member below a first member", the second member may be in contact with the first member or may be remote from the first member. In the latter case, a third member may be interposed between the first member and the second member. On the other hand, with such expressions “a second member on a first member” and “a first member on a second member”, the second member is in contact with the first member.

In addition, it is assumed that there is an observation position to observe the electronic device on a tip side of an arrow in the third direction Z, and viewing from this observation position toward an X-Y plane defined by the first direction X and the second direction Y is referred to as a planar view. Viewing a cross section of the electronic device in an X-Z plane defined by the first direction X and the third direction Z or a Y-Z plane defined by the second direction Y and the third direction Z is referred to as a cross-sectional view.

Embodiment

FIG. 1 is an exploded perspective view illustrating an electronic device according to an embodiment. An electronic device ERP illustrated in FIG. 1 includes an illumination device ILD, a display panel PNL, and an imaging element PA. Although details will be described later, the display panel PNL is a liquid crystal display panel and includes a liquid crystal element LCD.

The illumination device ILD includes a light guide LG1, a light source EM1, and a housing CS. The illumination device ILD illuminates, for example, the display panel PNL illustrated in a simplified manner by a broken line in FIG. 1.

The light guide LG1 is formed in a flat plate shape parallel to an X-Y plane defined by a first direction X and a second direction Y. The light guide LG1 is opposed to the display panel PNL. The light guide LG1 includes a side surface S1, a side surface S2 opposite to the side surface S1, and an opening portion OP1. The side surfaces S1 and S2 extend along the first direction X. For example, the side surfaces S1 and S2 are surfaces parallel to an X-Z plane defined by the first direction X and a third direction Z. The opening portion OP1 is a through hole penetrating the light guide LG1 along the third direction Z. The opening portion OP1 is located between the side surfaces S1 and S2 in the second direction Y, and is nearer to the side surface S2 than to the side surface S1.

A plurality of the light sources EM1 are arranged spaced apart along the first direction X. Each of the light sources EM1 is mounted on a wiring substrate FPC1 and electrically connected to the wiring substrate FPC1.

The housing CS accommodates the light guide LG1 and the light source EM1. The housing CS includes side walls W1 to W4, a bottom plate BP, an opening portion OP2, and a protruding portion PP. The side walls W1 and W2 extend along the first direction X and are opposed to each other. The side walls W3 and W4 extend along the second direction Y and are opposed to each other. The opening portion OP2 is a through hole penetrating the bottom plate BP along the third direction Z. The opening portion OP2 overlaps the opening portion OP1 in the third direction Z. The protruding portion PP protrudes from the bottom plate BP toward the display panel PNL along the third direction Z and is provided so as to surround the opening portion OP2.

The imaging element PA of the electronic device ERP illustrated in FIG. 1 is provided so as to overlap the opening portion OP2 in the third direction Z. The imaging element PA is mounted on a wiring substrate FPC2 and is electrically connected to the wiring substrate FPC2.

The display panel PNL overlaps the light guide LG1 and also overlaps the imaging element PA at the opening portion OP1.

Figure 2B:
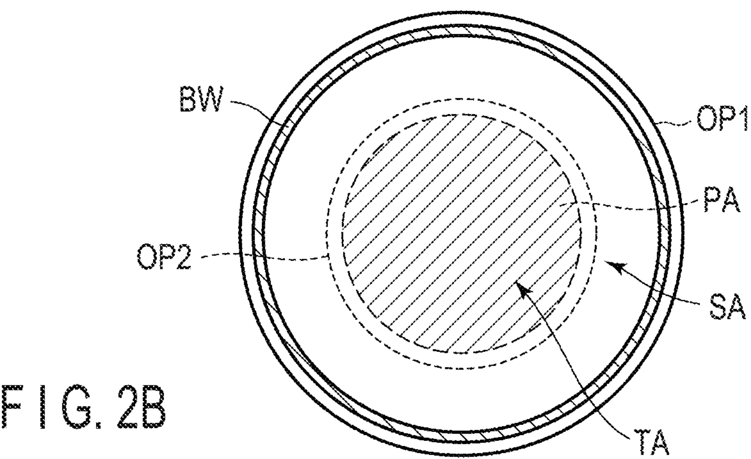
FIG. 2B is an enlarged plan view of a part of the electronic device.

FIGS. 2A and 2B are plan views of the electronic device according to the embodiment. FIG. 2A is a plan view of the entire electronic device ERP, and FIG. 2B is an enlarged plan view of a part of the electronic device ERP.

As illustrated in FIG. 2A, the light source EM1 is disposed between the side surface S1 of the light guide LG1 and the side wall W1 of the housing CS and is opposed to the side surface S1. Incidentally, in FIG. 2, the wiring substrate FPC1 illustrated in FIG. 1 is not illustrated. Illumination light emitted from the light source EM1 enters the light guide LG1 from the side surface S1, and travels inside the light guide LG1 from the side surface S1 toward the side surface S2 along the second direction Y.

The opening portion OP2 of the housing CS is located inside the opening portion OP1 of the light guide LG1. In the example illustrated in FIG. 2A, the opening portions OP1 and OP2, which are both circular in planar view, may have other shapes such as an elliptical shape and a polygonal shape.

Figure 3:
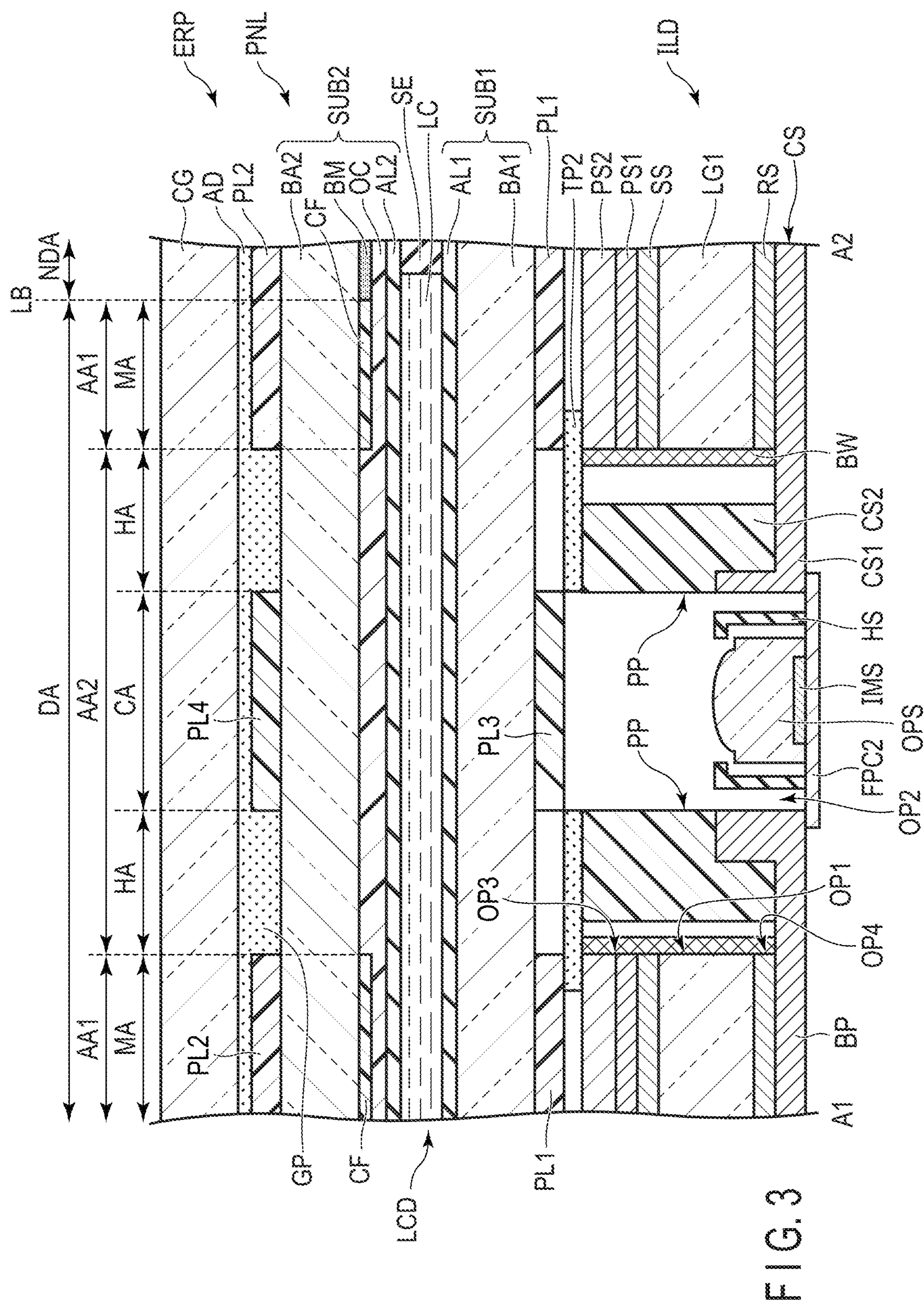
FIG. 3 is a cross-sectional view of the electronic device taken along line A1-A2 in FIG. 2A.

FIG. 3 is a cross-sectional view of the electronic device taken along line A1-A2 in FIG. 2. FIG. 3 illustrates a cross section of the electronic device ERP along the second direction Y including the display panel PNL, the imaging element PA, and the illumination device ILD.

In the electronic device ERP illustrated in FIG. 3, the opening portion OP2 of the housing CS of the illumination device ILD is located inside the opening portion OP1 of the light guide LG1. The imaging element PA is located inside the opening portions OP1 and OP2.

The illumination device ILD further includes a light block wall BW. The light block wall BW is located inside the opening portion OP1. In the example illustrated in FIG. 3, the light block wall BW, which is in contact with a reflective sheet RS described later, the light guide LG1, a diffusion sheet SS, and prism sheets PS1 and PS2, does not need to be in contact with them. The light block wall BW is made from, for example, resin colored in black. Incidentally, if not necessary, the light block wall BW does not need to be provided.

The illumination device ILD illustrated in FIG. 3 further includes the reflective sheet RS, the diffusion sheet SS, and the prism sheets PS1 and PS2.

The reflective sheet RS, the light guide LG1, the diffusion sheet SS, the prism sheet PS1, and the prism sheet PS2 are disposed in this order along the third direction Z and are accommodated in the housing CS. Similarly to FIG. 3, the housing CS includes a housing CS1 made from metal and a pedestal CS2 made from resin. The pedestal CS2 constitutes the protruding portion PP together with the housing CS1. Each of the diffusion sheet SS, the prism sheet PS1, and the prism sheet PS2 has an opening portion OP3 overlapping the opening portion OP1. The reflective sheet RS has an opening portion OP4 overlapping the opening portion OP1. The protruding portion PP of the housing CS is located inside the opening portion OP1, the opening portion OP3, and the opening portion OP4.

A polarizer PL1, the display panel PNL, a polarizer PL2, and a cover member CG are disposed in this order along the third direction Z, and constitute the liquid crystal element LCD having an optical switch function for light traveling along the third direction Z.

The polarizers PL1 and PL3 are provided in contact with a base BA1 of a first substrate SUB1. An adhesive or an adhesive tape (not illustrated) is provided between the polarizer and the base (substrate), and the polarizer is bonded to the base.

An adhesive tape TP2 is, for example, a transparent or white double-sided adhesive tape, and bonds the illumination device ILD and the liquid crystal element LCD. In the example illustrated in FIG. 3, the adhesive tape TP2 bonds the polarizer PL1 and the protruding portion PP, and bonds the polarizer PL1 and the prism sheet PS2.

Examples of a material of the cover member CG include glass.

Although details will be described later, a transmission axis AX1 of the polarizer PL1 and a transmission axis AX2 of the polarizer PL2 are orthogonal to each other. A transmission axis AX3 of the polarizer PL3 and a transmission axis AX4 of a polarizer PL4 are orthogonal to each other. Alternatively, the transmission axis AX3 of the polarizer PL3 and the transmission axis AX4 of the polarizer PL4 may be parallel to each other. In the present embodiment, an initial alignment direction ORI of a liquid crystal layer LC and the transmission axis AX2 of the polarizer PL2 are parallel.

The initial alignment direction ORI of the liquid crystal layer LC and the transmission axis AX4 of the polarizer PL4 form an angle other than 0° or other than 90° with each other. In other words, the initial alignment direction ORI of the liquid crystal layer LC and the transmission axis AX4 of the polarizer PL4 are neither parallel nor orthogonal. Since the initial alignment direction ORI of the liquid crystal layer LC and the transmission axis AX2 of the polarizer PL2 are parallel, the transmission axis AX2 of the polarizer PL2 and the transmission axis AX4 of the polarizer PL4 form an angle other than 0° or other than 90° with each other. The angle formed by the initial alignment direction ORI of the liquid crystal layer LC (the transmission axis AX2 of the polarizer PL2) and the transmission axis AX4 of the polarizer PL4 is, for example, 45°. This will be described in detail later.

The display panel PNL includes a display region DA for displaying an image and a non-display region NDA adjacent to the display region DA and surrounding the display region DA. The display panel PNL includes the first substrate SUB1, a second substrate SUB2, a liquid crystal layer LC, and a sealant SE. The sealant SE is located in the non-display region NDA, bonds the first substrate SUB1 and the second substrate SUB2, and seals the liquid crystal layer LC. That is, the display region DA is a region that does not overlap the sealant SE in a region occupied by the first substrate SUB1, the second substrate SUB2, and the liquid crystal layer LC held between the first substrate SUB1 and the second substrate SUB2.

Hereinafter, main portions of the first substrate SUB1 and the second substrate SUB2 will be described. The first substrate SUB1 includes the base BA1 and an alignment film AL1. The second substrate SUB2 includes a base BA2, a color filter CF, a light-shielding layer BM, a transparent layer OC, and an alignment film AL2.

The base BA1 and the base BA2 are transparent substrates such as a glass substrate and a flexible resin substrate. The alignment films AL1 and AL2 are in contact with the liquid crystal layer LC.

The color filter CF, the light-shielding layer BM, and the transparent layer OC are located between the base BA2 and the liquid crystal layer LC. Incidentally, in the example illustrated in FIG. 3, the color filter CF is provided on the second substrate SUB2. Alternatively, the color filter CF may be provided on the first substrate SUB1.

The light-shielding layer BM is located in the non-display region NDA. A boundary LB between the display region DA and the non-display region NDA is defined by, for example, an inner end (end portion on the display region DA side) of the light-shielding layer BM. The sealant SE is provided at a position overlapping the light-shielding layer BM.

Although details of the color filter CF are omitted here, the color filter CF includes, for example, a red color filter disposed in a red pixel, a green color filter disposed in a green pixel, and a blue color filter disposed in a blue pixel. In addition, the color filter CF may include a transparent resin layer disposed in a white pixel. The transparent layer OC covers the color filter CF and the light-shielding layer BM. The transparent layer OC is, for example, a transparent organic insulating layer.

The display region DA has a region AA2 overlapping the opening portion OP1 and a region AA1 not overlapping the opening portion OP1. The region AA2 is provided in an island-like shape in the display region DA. In other words, the region AA2 is completely surrounded by the display region DA. The color filter CF is disposed in the region AA1, and the color filter CF is not disposed in the region AA2. The transparent layer OC is disposed over the regions AA1 and AA2, is in contact with the color filter CF in the region AA1, and is in contact with the base BA2 in the region AA2. The alignment film AL1 and the alignment film AL2 are provided over the regions AA1 and AA2.

In the present embodiment, the imaging element PA is, for example, a camera. Incidentally, for example, the imaging element PA may be one that detects visible light, one that detects infrared light, a proximity sensor that senses approach of a detection target, a detection element that detects infrared light reflected from a detection target, and the like, or a combination of these. The electronic device ERP may include a light emitting element instead of or in addition to the imaging element PA. Examples of the light emitting element include a projection element that projects an infrared ray toward a detection target.

The imaging element PA is provided so as to overlap the opening portion OP2 of the housing CS, and is located in the inside surrounded by the protruding portion PP. The imaging element PA overlaps the cover member CG, the polarizer PL4, the display panel PNL, the polarizer PL3, and the light guide LG2 in the third direction Z. Incidentally, a part or whole of the imaging element PA overlaps the display region DA of the display panel PNL in the third direction Z. In other words, in the electronic device ERP including the display panel PNL and the imaging element PA, the imaging element PA is preferably provided on the back side of the display panel PNL as viewed from the user of the electronic device ERP.

As described above, the imaging element PA overlaps the polarizers PL3 and PL4. In contrast, a region of the display panel PNL that does not overlap the imaging element PA overlaps the polarizers PL1 and PL2. More specifically, as illustrated in FIG. 3, when a region overlapping the imaging element PA in the display region DA of the display panel PNL is a region CA, the polarizers PL3 and PL4 are provided to overlap the region CA. In planar view, the polarizer PL3 is provided with a gap GP between the polarizer PL1 and the polarizer PL1, and the polarizer PL4 is provided with the gap GP between the polarizer PL2 and the polarizer PL2. In the display region DA, a region overlapping the polarizer PL2 is referred to as a region MA, and a region overlapping the gap GP is referred to as a region HA. The region MA is coincident with the region AA1. The region AA2 is coincident with a region occupied by the region HA and the region CA. Details, such as a positional relationship between the region CA, the region HA, the region MA, the polarizer PL3, the gap GP, and the polarizer PL4, will be described later.

Focusing on a positional relationship between the imaging element PA and the display region DA in FIG. 3, the imaging element PA overlaps the region CA in the region AA2. The imaging element PA includes, for example, an optical system OPS including at least one lens, a sensor element IMS, and a housing HS. The sensor element IMS is an image sensor capable of detecting an image. The housing HS accommodates the optical system OPS and the sensor element IMS. The optical system OPS is located between the display panel PNL and the sensor element IMS.

The polarizers PL1 and PL3 are bonded to the base BA1. The polarizers PL2 and PL4 are bonded to the base BA2. The polarizers PL2 and PL4 are bonded to the cover member CG by a transparent adhesive layer AD. The polarizer PL1 is disposed over the region AA1. Incidentally, the polarizers PL1, PL2, PL3, and PL4 may include an antireflective layer or the like as needed.

Although details will be described later, in the electronic device ERP illustrated in FIG. 3, a light-shielding layer BMA may be provided to cover the gap GP (region MA) between the polarizers PL2 and PL4. In addition, an upper electrode UE may be divided into a plurality of electrodes, and a voltage may be independently applied to each of the divided electrodes.

Figure 4A:
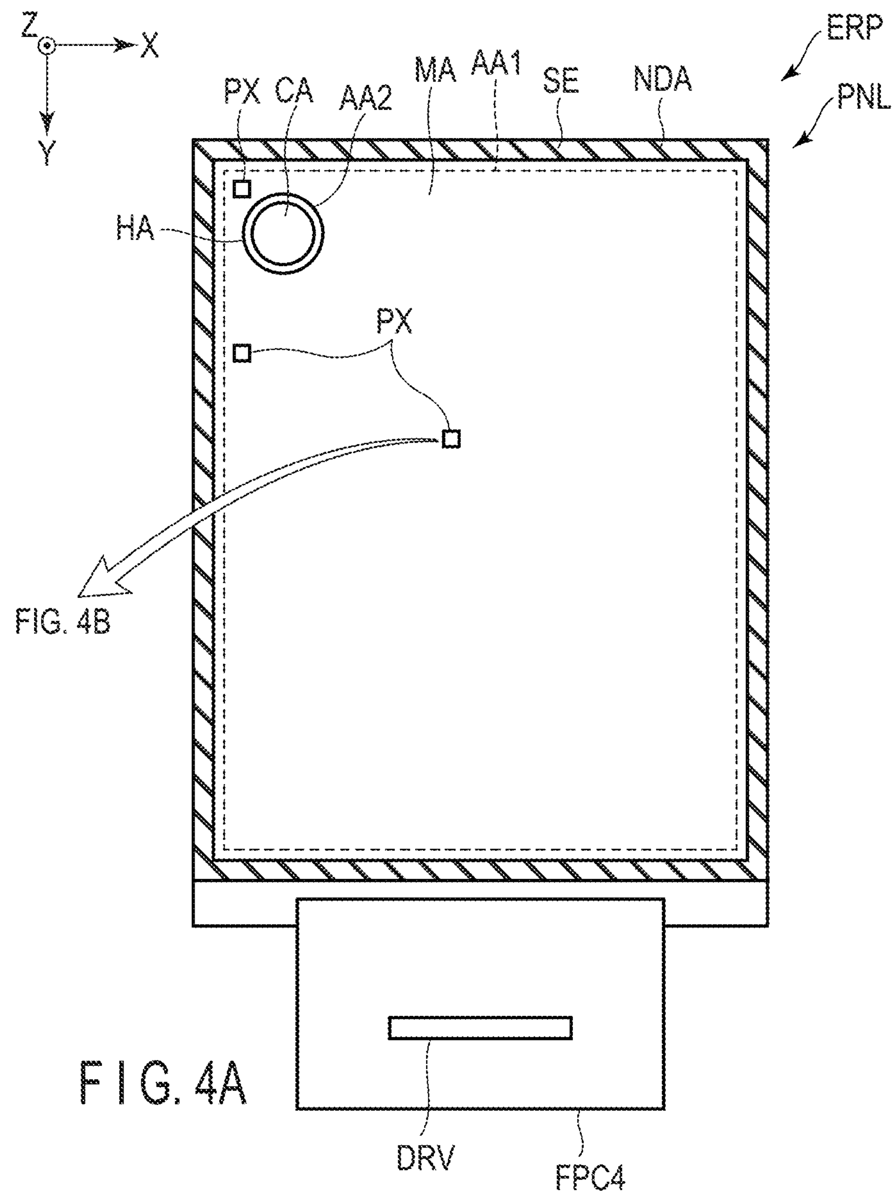
FIG. 4A is a view illustrating a display panel.
Figure 4B:
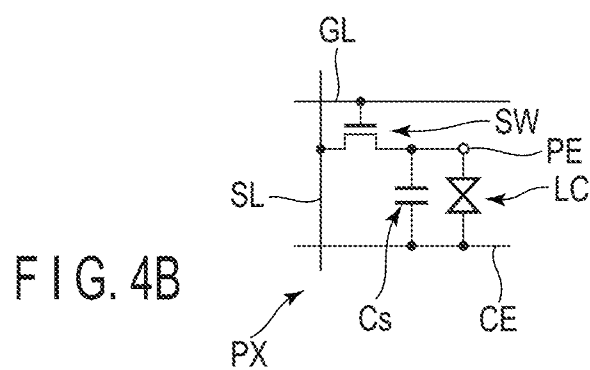
FIG. 4B is a circuit diagram of a pixel.

FIGS. 4A and 4B are diagrams illustrating a display panel. FIG. 4A is a plan view of the display panel PNL. FIG. 4B is a circuit diagram of a pixel PX. As illustrated in FIG. 4A, the display region DA is a substantially rectangular region not including a notch, but four corners may be rounded, or the display region DA may be a polygon or a circle other than a rectangle. The display region DA is located in the inside surrounded by the sealant SE.

The display panel PNL includes a plurality of the pixels PX arranged in a matrix in the first direction X and the second direction Y in the display region DA. Each of the pixels PX in the display region DA has the same circuit configuration.

As illustrated in FIG. 4B, each of the pixels PX includes a switching element SW, a pixel electrode PE, a common electrode CE, the liquid crystal layer LC, and the like. The switching element SW includes, for example, a thin-film transistor (TFT), and is electrically connected to a scanning line GL and a signal line SL. A control signal for controlling the switching element SW is supplied to the scanning line GL. A video signal is supplied to the signal line SL as a signal different from the control signal. The pixel electrode PE is electrically connected to the switching element SW.

The liquid crystal layer LC is driven by an electric field generated between the pixel electrode PE and the common electrode CE. Capacitance Cs is formed, for example, between an electrode having the same electric potential as the common electrode CE and an electrode having the same electric potential as the pixel electrode PE.

A wiring substrate FPC4 is mounted on and electrically connected to an extended portion Ex of the first substrate SUB1. A driver element DRV is mounted on the wiring substrate FPC4 and electrically connected to the wiring substrate FPC4. Incidentally, the driver element DRV may be mounted on the extended portion Ex and electrically connected to the extended portion Ex. The driver element DRV incorporates, for example, a display driver that outputs a signal necessary for image display, and the like. The wiring substrate FPC4 is a bendable flexible printed circuit.

In the display region DA, the pixel PX that does not overlap the imaging element PA corresponds to a pixel in the region MA illustrated in FIG. 3, and includes the color filter CF. In other words, the pixel PX can display any of red, green, and blue. In addition, in a case where the pixel PX is a white pixel, the pixel PX can display any one of white (or transparent), gray, and black.

As illustrated in FIG. 4A, and as described above, the pixel PX is not provided in the region HA and the region CA (that is, the region AA2) in the display region DA. Although details will be described later, in the region CA, an upper electrode and a lower electrode that generate an electric field (also referred to as a longitudinal electric field) between the first substrate SUB1 and the second substrate SUB2, that is, along the third direction Z are provided instead of the pixel PX. In the region CA, the liquid crystal layer LC is driven by the longitudinal electric field. The region AA2 where the pixel PX is not provided can also be considered as a non-display region.

As illustrated in FIGS. 3 and 4A, the imaging element PA overlaps the display panel PNL. More specifically, the imaging element PA overlaps the display region DA of the display panel PNL. Therefore, the display region DA can be enlarged. In addition, since it is not necessary to provide a space for installing the imaging element PA in the non-display region NDA, a frame width of the non-display region NDA can be reduced.

Figure 5:
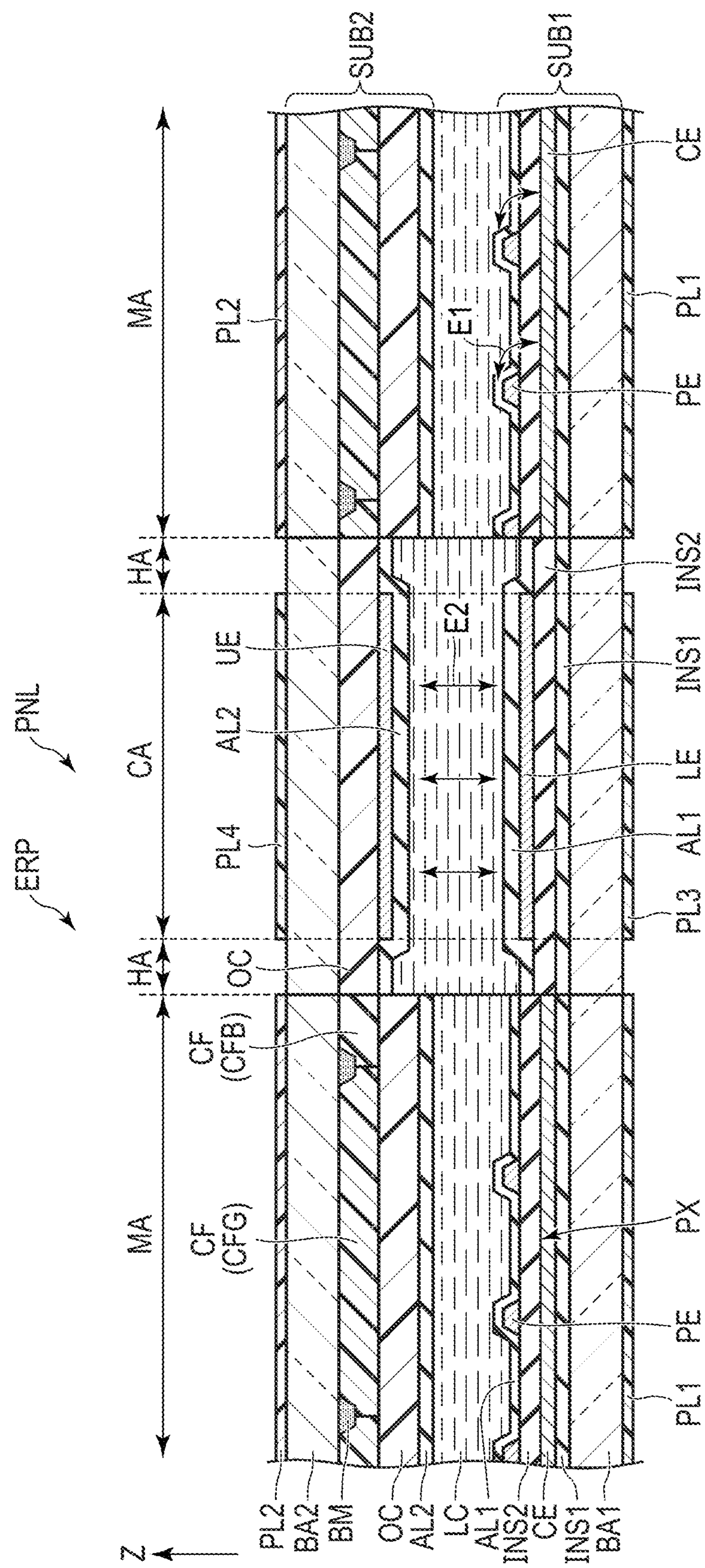
FIG. 5 is a cross-sectional view of the display panel.

FIG. 5 is a cross-sectional view of the display panel. Incidentally, in the display panel PNL illustrated in FIG. 5, the illumination device ILD is not illustrated. In the region MA of the display panel PNL illustrated in FIG. 5, the liquid crystal layer LC is driven between the polarizer PL1 and the polarizer PL2 by using a lateral electric field.

As illustrated in FIG. 5, the first substrate SUB1 includes insulating layers INS1 and INS2, the common electrode CE, and the pixel electrode PE between the base BA1 and the alignment film AL1. Incidentally, the scanning line GL, the signal line SL, and the switching element SW illustrated in FIGS. 4A and 4B are located, for example, between the base BA1 and the common electrode CE. The common electrode CE is located on the insulating layer INS1 and covered with the insulating layer INS2. The pixel electrode PE is located on the insulating layer INS2 and covered with the alignment film AL1. Each of the pixel electrodes PE is opposed to the common electrode CE via the insulating layer INS2. The common electrode CE and the pixel electrode PE are made from a transparent conductive material such as indium tin oxide (ITO) or indium zinc oxide (IZO). The pixel electrode PE is, for example, a linear electrode or a comb-tooth-shaped electrode, and the common electrode CE is, for example, a plate-like electrode commonly provided over a plurality of the pixels PX. Incidentally, the structure may be such that the pixel electrode PE is a plate-like electrode, and the linear common electrode CE is provided between the pixel electrode PE and the liquid crystal layer LC. Though not described in detail, the insulating layer INS1 includes an inorganic insulating layer and an organic insulating layer. The insulating layer INS2 is, for example, an inorganic insulating layer such as silicon nitride.

In the second substrate SUB2, the light-shielding layer BM is integrally formed with the light-shielding layer BM in the non-display region NDA illustrated in FIG. 2. The color filter CF includes a red color filter CFR, a green color filter CFG, and a blue color filter CFB. The green color filter CFG is opposed to the pixel electrode PE. The red color filter CFR and the blue color filter CFB are also opposed to other ones of the pixel electrodes PE (not illustrated).

The display panel PNL includes, for example, a scanning line drive circuit (not illustrated) electrically connected to the scanning line GL illustrated in FIG. 4B and a driver (not illustrated) including a signal line drive circuit electrically connected to the signal line SL. The driver outputs a signal necessary for image display to each of the pixels PX in the region MA in the display region DA, and controls the transmittance of the liquid crystal layer LC. The transmittance of the liquid crystal layer LC is controlled according to the magnitude of the voltage applied to the liquid crystal layer LC.

Figure 6A:
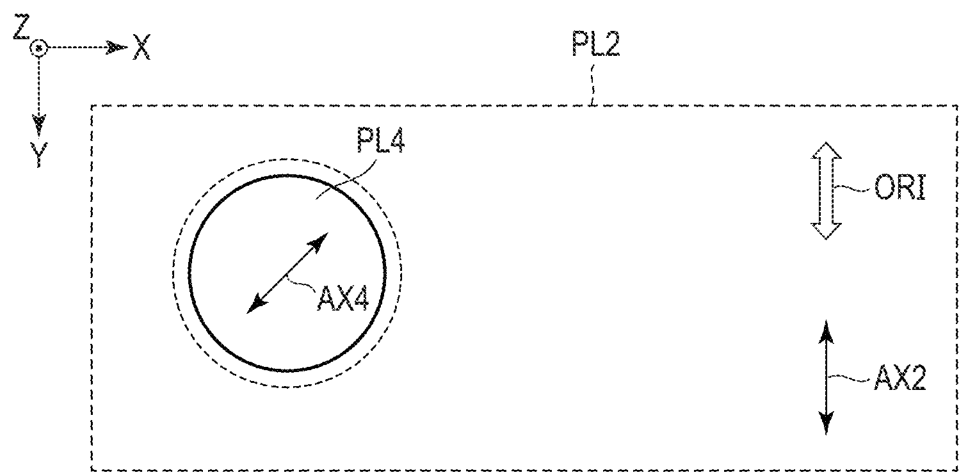
FIG. 6A is a view illustrating a relationship between a transmission axis of a polarizer and an initial alignment direction of a liquid crystal layer.
Figure 6B:
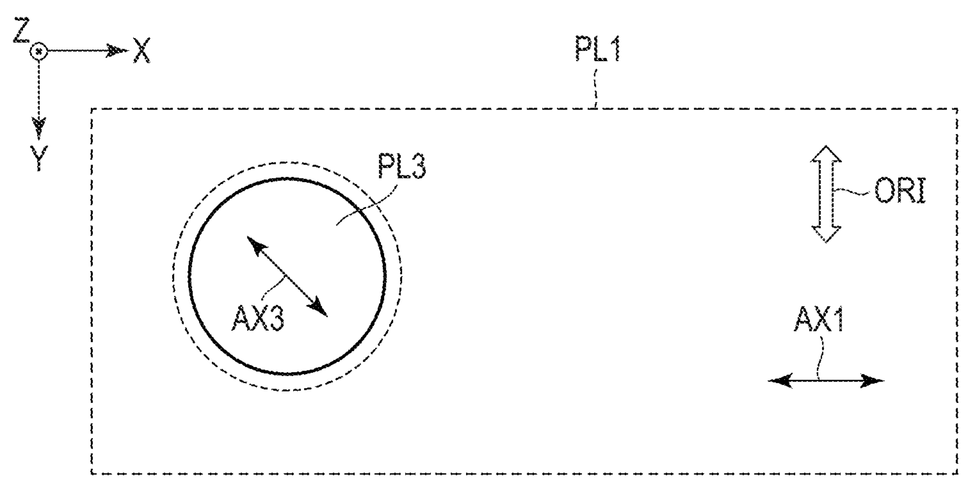
FIG. 6B is a view illustrating a relationship between the polarizer and the transmission axis of the polarizer, and the initial alignment direction of the liquid crystal layer.

FIGS. 6A and 6B are views illustrating a relationship between a transmission axis of the polarizer and an initial alignment direction of the liquid crystal layer. FIG. 6A illustrates a relationship between the polarizer PL2 and the transmission axis AX2 of the polarizer PL2, the polarizer PL4 and the transmission axis AX4 of the polarizer PL4, and the initial alignment direction ORI of the liquid crystal layer LC. FIG. 6B illustrates a relationship between the polarizer PL1 and the transmission axis AX1 of the polarizer PL1, the polarizer PL3 and the transmission axis AX3 of the polarizer PL3, and the initial alignment direction ORI of the liquid crystal layer LC.

For example, in an off state in which no voltage is applied to the liquid crystal layer LC in the pixel PX, liquid crystal molecules included in the liquid crystal layer LC are aligned along the initial alignment direction ORI between the alignment films AL1 and AL2. The transmission axis AX1 of the polarizer PL1 and the transmission axis AX2 of the polarizer PL2 are orthogonal to each other. In addition, as described above, the initial alignment direction ORI of the liquid crystal layer LC and the transmission axis AX2 of the polarizer PL2 are parallel. Therefore, in the off state, light guided from the light source EM1 illustrated in FIG. 1 to the pixel PX is absorbed by the polarizers PL1 and PL2. For this reason, the display panel PNL displays black in the pixel PX in the off state.

In contrast, in an on state in which voltage is applied to the liquid crystal layer LC, liquid crystal molecules of the liquid crystal layer LC are aligned in a direction different from the initial alignment direction ORI by an electric field E1 formed between the pixel electrode PE and the common electrode CE, and the alignment direction is controlled by the electric field E1. In the electric field E1, an electric line of force is generated substantially parallel to the X-Y plane, and thus the electric field E1 can be considered to be a lateral electric field. In the on state, a part of light guided to the pixel PX is transmitted through the polarizers PL1 and PL2. For this reason, the liquid crystal element LCD displays a color corresponding to the color filter CF in the pixel PX1 in the on state.

The above example corresponds to what is called a normally-black mode in which black is displayed in the off state. However, a normally-white mode in which black is displayed in the on state (white is displayed in the off state) may be applied.

Returning to FIG. 5, a configuration of the display panel PNL will be described. As illustrated in FIG. 5, the region CA in the display region DA is different from the region MA in that the upper electrode UE is provided on the second substrate SUB2.

In the region CA, the first substrate SUB1 includes the insulating layers INS1 and INS2 and a lower electrode LE between the base BA1 and the alignment film AL1. However, the common electrode CE is not provided in the region CA. For example, the lower electrode LE is located on the insulating layer INS2 and covered with the alignment film AL1. Incidentally, in FIG. 5, the lower electrode LE is an electrode on the same layer as the pixel electrode PE.

In the region CA, the second substrate SUB2 includes the transparent layer OC and the upper electrode UE between the base BA2 and the alignment film AL2. The upper electrode UE is covered with the alignment film AL2.

The upper electrode UE is disposed to be opposed to the polarizer PL3.

An electric field E2 is generated in a direction parallel to the third direction Z between the lower electrode LE provided on the first substrate SUB1 and the upper electrode UE provided on the second substrate SUB2. In the region CA, the liquid crystal layer LC is driven by the electric field E2, what is called a longitudinal electric field, in the direction parallel to the third direction Z as described above.

In the region CA, the liquid crystal layer LC is driven in an electrically controlled birefringence (ECB) mode. The ECB mode is a drive mode using birefringence property of a liquid crystal, and in the ECB mode, retardation is changed by voltage application to a liquid crystal molecule, and transmission and non-transmission of light are controlled.

As illustrated in FIGS. 6A and 6B, the transmission axis AX3 of the polarizer PL3 and the transmission axis AX4 of the polarizer PL4 are orthogonal to each other. As described above, the initial alignment direction ORI of the liquid crystal layer LC and the transmission axis AX4 of the polarizer PL4 intersect each other at, for example, 45°. In the region CA, when the electric field E2 is not generated between the upper electrode UE and the lower electrode LE, that is, when no voltage is applied to the liquid crystal layer LC, a circularly polarized component of light guided to the liquid crystal layer LC passes through the liquid crystal layer LC. In this manner, the region CA performs white display.

In contrast, when the electric field E2 is generated between the upper electrode UE and the lower electrode LE, that is, when voltage is applied to the liquid crystal layer LC, the liquid crystal molecules contained in the liquid crystal layer LC are aligned by the electric field E2. In this manner, light guided to the liquid crystal layer LC is absorbed by the polarizers PL3 and PL4.

That is, the region CA corresponds to what is called a normally-white mode in which white is displayed in the off state. However, if necessary, the normally-black mode may be applied.

As described above, in the region MA where the pixel PX is provided, the liquid crystal layer LC is driven by the electric field E1 that is a lateral electric field. Driving the liquid crystal layer LC in a lateral electric field (also simply referred to as a lateral electric field mode) is advantageous in that a wide viewing angle can be obtained as a display device.

However, in the lateral electric field mode, since distribution of electric field intensity generally occurs in a plane, distribution of transmittance and refractive index of the liquid crystal layer LC is likely to occur, and the light and shade corresponding to an electrode pattern of the pixel electrode PE are generated. For this reason, in a case where a region overlapping the imaging element PA is also controlled by a lateral electric field, there is a possibility that light and shade not present in an original subject is generated in an image of the subject that is transmitted through the liquid crystal layer LC and enters the imaging element PA.

In view of the above, in the present embodiment, in the region MA where the pixel PX is provided, the liquid crystal layer LC is driven by the lateral electric field E1, and in a region overlapping the imaging element PA, the liquid crystal layer LC is driven by the electric field E2 that is a longitudinal electric field.

In this manner, light and shade according to an electrode pattern of the pixel electrode PE do not occur, and there is no possibility that light and shade occur in the image of a subject. Therefore, it is possible to suppress degradation in image quality of the image of a subject.

Referring back to FIG. 5 again, the gap GP and the region HA will be described. As described above, the gap GP is located between the polarizers PL1 and PL3 and between the polarizers PL2 and PL4 in planar view. In the display region DA, the region HA overlapping the gap GP is not provided with a polarizer. In addition, as illustrated in FIG. 5, the pixel electrode PE and the upper electrode UE are not provided in the region HA.

Here, the display panel PNL in a case where the polarizers PL3 and PL4 are not provided will be considered. FIG. 7A is a schematic cross-sectional view of an electronic device of a comparative example. FIG. 7B is a schematic cross-sectional view of the electronic device according to the embodiment, illustrating main parts of FIGS. 3 and 5.

Incidentally, for easy understanding of the drawings, description of some constituent elements is omitted in FIGS. 7A and 7B.

In the electronic device ERP of the comparative example illustrated in FIG. 7A, a retardation film RMD1 is provided on the first substrate SUB1, and a retardation film RMD2 is provided on the second substrate SUB2 so as to overlap the region AA2.

In contrast, the polarizer PL1 covers the retardation film RMD1 and overlaps the entire surface of the base BA1. In addition, the polarizer PL2 covers the retardation film RMD2 and overlaps the entire surface of the base BA2. That is, the polarizers PL1 and PL2 are continuously disposed over the region MA (region AA1) and the region AA2.

An optical clear adhesive (OCA) is provided on the base BA1, the retardation film RMD1, and a portion of the base BA1 and the polarizer PL1 not overlapping the retardation film RMD1, so as to bond the base BA1, and the retardation film RMD1 and the polarizer PL1. The optical clear adhesive OCA is a transparent adhesive, and has the same refractive index as the refractive index of the base BA1.

Similarly, the optical clear adhesive (OCA) is provided on the base BA2, the retardation film RMD2, and a portion of the base BA2 and the polarizer PL2 not overlapping the retardation film RMD2, so as to bond the base BA2, and the retardation film RMD2 and the polarizer PL2.

In the electronic device ERP illustrated in FIG. 7A, the liquid crystal layer LC is driven by the longitudinal electric field in the ECB mode in the region AA2. However, since the polarizers PL1 and PL2 are shared with the region MA (region AA1), the retardation films (retardation films RMD1 and RMD2) are required for the first substrate SUB1 and the second substrate SUB2, respectively.

However, in the electronic device ERP illustrated in FIG. 7A, since the retardation film RMD1 and the polarizer PL1, and the retardation film RMD2 and the polarizer PL2 overlap in the region AA2, the polarizers PL1 and PL2 swell. The swelled portions of the polarizers PL1 and PL2 are referred to as convex portions CV1 and CV2, respectively. When the convex portions CV1 and CV2 are generated, incident light INL incident on the electronic device ERP may be refracted by the convex portions CV1 and CV2 and blurred. In this manner, an image of a subject transmitted through the liquid crystal layer LC and incident on the imaging element PA is captured as a blurred image due to the convex portions CV1 and CV2.

In view of the above, in the present embodiment, as illustrated in FIG. 7B and described above, in the region CA overlapping the imaging element PA, another one of the polarizer PL3 and another one of the polarizer PL4 are provided with the gap GP from the polarizers PL1 and PL2. Since the transmission axes of the polarizers PL3 and PL4 intersect the initial alignment direction ORI of the liquid crystal layer LC at an angle other than 0° or other than 90°, for example, 45°, the region CA can be driven in the ECB mode.

As described above, in the present embodiment, generation of light and shade in the image of a subject incident on the imaging element PA and blurring of the image are suppressed. In this manner, quality of the image captured by the imaging element PA can be improved.

Figure 8A:
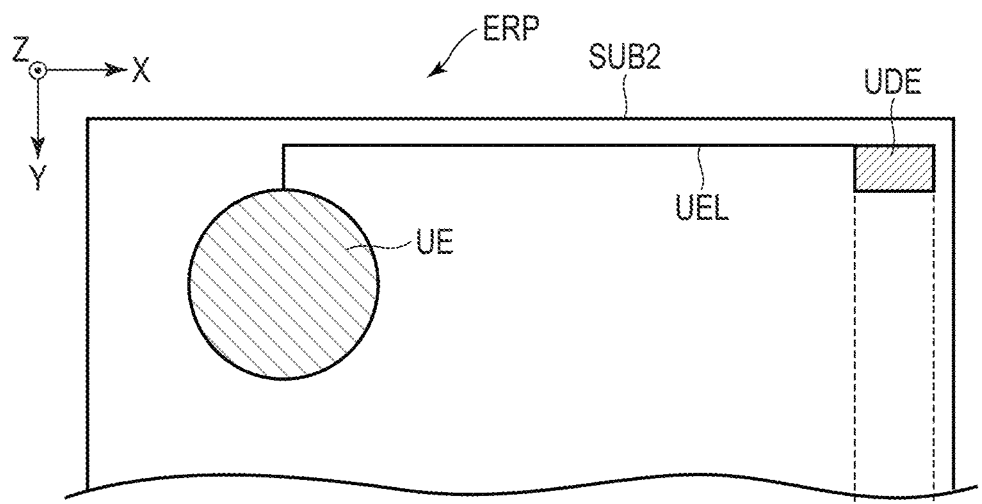
FIG. 8A is a schematic plan view of the electronic device.
Figure 8B:
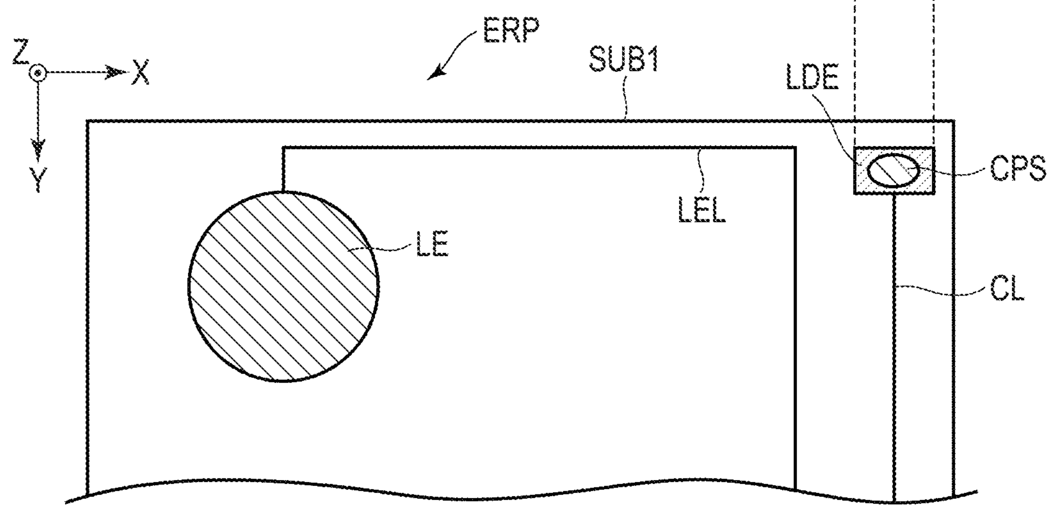
FIG. 8B is a schematic plan view of the electronic device.

Here, a connection relationship with the upper electrode UE will be described with reference to FIGS. 8A and 8B. FIGS. 8A and 8B are schematic plan views of an electronic device. FIG. 8A is a schematic plan view of the second substrate SUB2, and FIG. 8B is a schematic plan view of the first substrate SUB1.

As illustrated in FIG. 8A, the second substrate SUB2 is provided with a wiring line UEL connected to the upper electrode UE, and an electrode UDE connected to the wiring line UEL. The electrode UDE is provided in a corner portion of the second substrate SUB2.

An electrode LDE is provided on the first substrate SUB1 so as to be opposed to the electrode UDE. The electrode LDE is provided at a position corresponding to the electrode UDE in the first substrate SUB1.

A conductive paste CPS is provided between the electrode UDE and the electrode LDE, in other words, between the first substrate SUB1 and the second substrate SUB2. The electrode UDE and the electrode LDE are electrically connected by the conductive paste. A wiring line CL is connected to the electrode LDE. The wiring line CL is connected to the driver element DRV (not illustrated).

Incidentally, the lower electrode LE is also connected to the driver element DRV (not illustrated) via the wiring line LEL provided on the first substrate SUB1.

As described above, according to the present embodiment, generation of light and shade in the image of a subject incident on the imaging element PA can be suppressed and blurring of the image can be prevented. Therefore, it is possible to obtain an electronic device capable of improving quality of an image captured by the imaging element PA.

Configuration Example 1

Figure 9A:
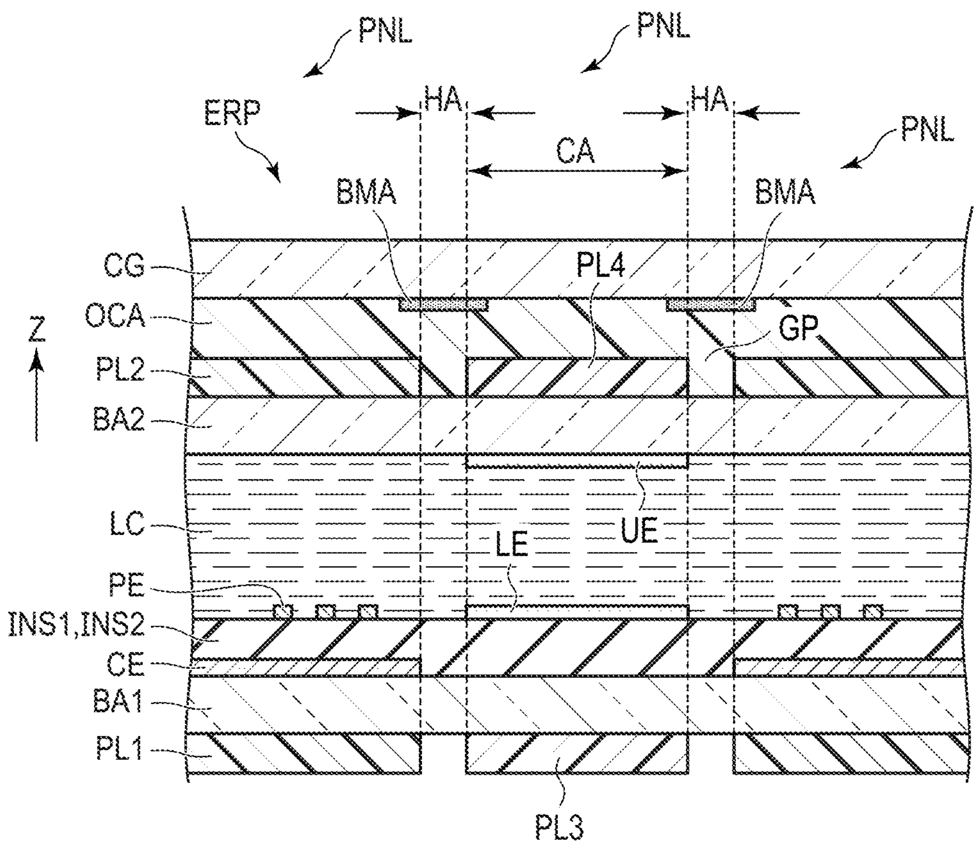
FIG. 9A is a view illustrating a configuration example of the electronic device according to the embodiment.
Figure 9B:
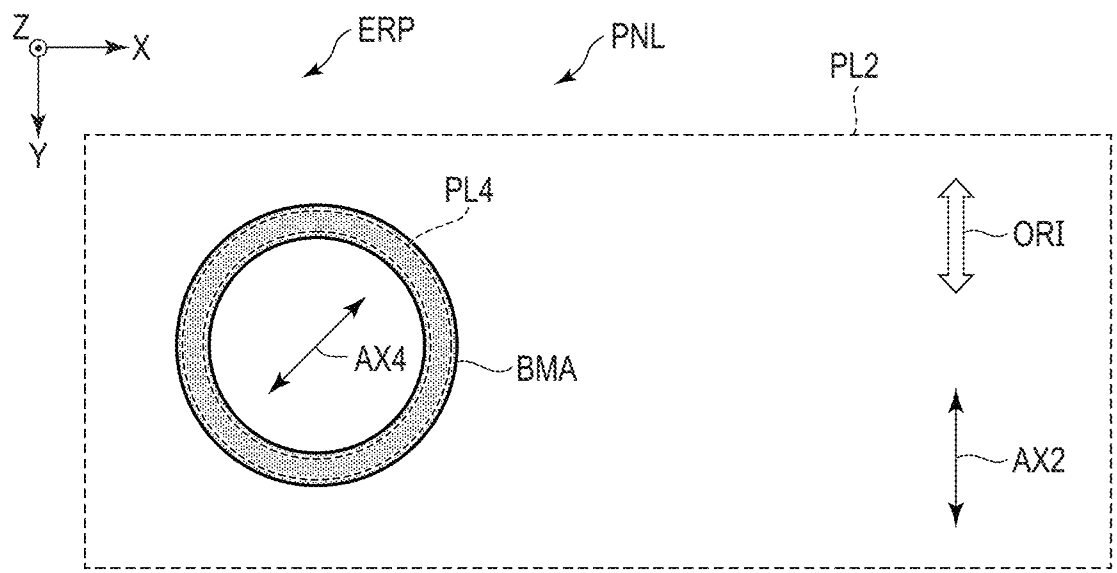
FIG. 9B is a view illustrating a configuration example of the electronic device according to the embodiment.

FIGS. 9A and 9B are views illustrating another configuration example of the electronic device according to the embodiment. The configuration example illustrated in FIGS. 9A and 9B is different from the configuration example illustrated in FIG. 7B in that a light-shielding layer is provided between a polarizer on an imaging element and a polarizer in a display region.

FIG. 9A is a cross-sectional view of the electronic device ERP of the present configuration example, and FIG. 9B is a schematic plan view of the electronic device ERP of the present configuration example. The electronic device ERP illustrated in FIGS. 9A and 9B includes a light-shielding layer BMA that covers a region (the gap GP) between the polarizer PL4 and the polarizer PL2, that is, the region HA in planar view, in addition to the example illustrated in FIGS. 7B and 6B. The light-shielding layer BMA is provided so as to overlap the entire surface of the region HA, a part of the region MA, and a part of the region CA.

The electronic device ERP illustrated in FIGS. 9A and 9B has the optical clear adhesive OCA between the polarizers PL2 and PL4 and the base BA2, and bonds the polarizers PL2 and PL4 and the base BA2. The light-shielding layer BMA is provided between the cover member CG and the optical clear adhesive OCA. As described above, the optical clear adhesive OCA is a transparent adhesive. Optical clear resin (OCR) may be used instead of the optical clear adhesive OCA.

By providing the light-shielding layer BMA between the polarizers PL4 and PL2, it is possible to prevent the region HA (gap GP) from being visually recognized. This improves display quality of the display panel PNL of the electronic device ERP.

Also in the present configuration example, the same effect as that of the above-described embodiment is obtained.

Configuration Example 2

FIGS. 10A and 10B are views illustrating another configuration example of an electronic device according to the embodiment. The configuration example illustrated in FIGS. 10A and 10B is different from the configuration example illustrated in FIG. 6B in that a shape of a lower electrode is a concentric circle.

FIG. 10A is a schematic plan view in a case where the lower electrode LE and a wiring line of the lower electrode LE are integrally made from the same material, and FIG. 10B is a schematic plan view in a case where the lower electrode LE and a wiring line of the lower electrode LE are formed on different material layers. In the electronic device ERP illustrated in FIGS. 10A and 10B, the lower electrode LE has three electrodes LE1, LE2, and LE3 disposed in concentric circles. A wiring line LEW1 integrally formed with the electrode LE1 is connected to the electrode LE1. A wiring line LEW2 integrally formed with the electrode LE2 is connected to the electrode LE2. A wiring line LEW3 integrally formed with the electrode LE3 is connected to the electrode LE3.

Slits SLT are provided between the electrode LE1 and the wiring line LEW1, between the electrode LE2 and the wiring line LEW2, and between the electrode LE3 and the wiring line LEW3. The electrodes LE1, LE2, and LE3 are insulated by the slit SLT.

Voltage is independently applied to the electrodes LE1, LE2, and LE3 from the outside via the wiring lines LEW1, LEW2, and LEW3. A diaphragm function can be imparted to the region CA by changing the alignment of the liquid crystal layer LC according to the electrode to which voltage is applied. For example, when voltage is applied to the electrodes LE3 and LE2, a region overlapping the electrode LE3 and the electrode LE2 is displayed in black and incident light is blocked. In contrast, in a region overlapping the electrode LE1, white display is performed, and incident light reaches the imaging element PA via the electrode LE1.

Incidentally, in FIG. 10A, the lower electrode LE is divided into three to provide the electrodes LE1, LE2, and LE3. However, the number of divisions is not limited to three. In addition, when the lower electrode LE is not a circular electrode but has another shape, for example, a rectangular electrode, the divided electrodes are preferably disposed at regular intervals.

In the electronic device ERP illustrated in FIG. 10B, the lower electrode LE has three of the electrodes LE1, LE2, and LE3 disposed in concentric circles. The wiring lines LEW1, LEW2, and LEW3 connected to the electrodes LE1, LE2, and LE3, respectively, are formed on different wiring line layers as described above. An insulating layer is provided between the electrodes LE1, LE2, and LE3 and the wiring lines LEW1, LEW2, and LEW3. On the insulating layer, a contact hole CH1 is provided in a region where the electrode LE1 and the wiring line LEW1 overlap. In addition, on the insulating layer, a contact hole CH2 is provided in a region where the electrode LE2 and the wiring line LEW2 overlap. On the insulating layer, a contact hole CH3 is provided in a region where the electrode LE3 and the wiring line LEW3 overlap.

The electrode LE1 is connected to the wiring line LEW1 through the contact hole CH1. The electrode LE2 is connected to the wiring line LEW2 through the contact hole CH2. The electrode LE3 is connected to the wiring line LEW3 through the contact hole CH3.

The electrodes LE1, LE2, and LE3 are electrodes on the same layer as the pixel electrode PE as described above. The wiring lines LEW1, LEW2, and LEW3 may be formed of, for example, electrodes on the same layer as the common electrode CE. Alternatively, the wiring lines LEW1, LEW2, and LEW3 may be formed of, for example, a wiring line layer on the same layer as the signal line SL (source electrode) and the drain electrode of the switching element SW. In this case, for example, the insulating layer INS2 is disposed between the electrodes LE1, LE2, and LE3 and the wiring lines LEW1, LEW2, and LEW3.

Also in the example illustrated in FIG. 10B, voltage is independently applied to the electrodes LE1, LE2, and LE3 from the outside via the wiring lines LEW1, LEW2, and LEW3.

According to the present configuration example, the diaphragm function can be imparted to the region CA, and an image of a subject incident on the imaging element PA can be made clearer.

Also in the present configuration example, the same effect as that of the embodiment is obtained.

While certain embodiments have been described, these embodiments have been presented by way of example only, and are not intended to limit the scope of the inventions. Indeed, the novel embodiments described herein may be embodied in a variety of other forms, furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
- an image sensor;
- an optical system;
- a housing comprising a resin part, the housing storing the image sensor and the optical system;
- a first substrate;
- a second substrate;
- a liquid crystal layer between the first substrate and the second substrate;
- a first polarizer in contact with the first substrate; and
- a second polarizer in contact with the second substrate, wherein
- each of the first substrate and the second substrate overlaps with the image sensor and the housing in a planar view, the first polarizer includes a first part which overlaps with the image sensor in the planar view, and a second part which does not overlap with the image sensor in the planar view, the second polarizer includes a third part which overlaps with the image sensor in the planar view, and a fourth part which does not overlap with the image sensor in the planar view, the first part of the first polarizer and the second part of the first polarizer are apart from each other, and the third part of the second polarizer and the fourth part of the second polarizer are apart from each other.

2. The electronic device according to claim 1, further comprising a first flexible substrate and a second flexible substrate, wherein the first flexible substrate is connected with the first substrate, and the second flexible substrate is connected with the image sensor.

3. The electronic device according to claim 1, wherein the housing further comprises a pedestal part in contact with the resin part.

4. The electronic device according to claim 2, wherein the housing further comprises a pedestal part in contact with the resin part, and the second flexible substrate is in contact with the resin part.

5. The electronic device according to claim 4, wherein the second flexible substrate is not in contact with the pedestal part.

6. The electronic device according to claim 1, wherein an air gap is between the first part and the optical system or between the third part and the optical system.

7. The electronic device according to claim 1, wherein an adhesive layer is between the first substrate and the housing.

8. The electronic device according to claim 1, wherein transparent electrodes having concentric circles shape are on the first substrate or the second substrate, and the transparent electrodes overlap with the first part and the third part.

* * * * *